United States Patent
Bryant et al.

(10) Patent No.: US 7,982,201 B2
(45) Date of Patent: Jul. 19, 2011

(54) SYSTEM AND METHOD FOR DETECTION OF LIQUID LEVEL IN A VESSEL

(75) Inventors: Steven Thomas Bryant, New Hartford, NY (US); Charles Paul Barber, Fayetteville, NY (US)

(73) Assignee: JADAK, LLC, North Syracuse, NY (US)

( * ) Notice: Subject to any disclaimer, the term of this patent is extended or adjusted under 35 U.S.C. 154(b) by 51 days.

(21) Appl. No.: 12/555,051

(22) Filed: Sep. 8, 2009

(65) Prior Publication Data

US 2011/0056290 A1    Mar. 10, 2011

(51) Int. Cl.
*G01F 23/00*    (2006.01)

(52) U.S. Cl. .......................... 250/577; 73/293
(58) Field of Classification Search .............. 250/577; 356/239.6; 73/293; 222/64
See application file for complete search history.

(56) References Cited

U.S. PATENT DOCUMENTS

| | | | |
|---|---|---|---|
| 3,636,360 A | | 1/1972 | Oishi et al. |
| 4,039,845 A | | 8/1977 | Oberhansli et al. |
| 4,084,426 A | * | 4/1978 | Gales ............................ 73/60.11 |
| 4,123,227 A | * | 10/1978 | Heim et al. .................... 436/134 |
| 4,193,004 A | | 3/1980 | Lobdell et al. |
| 4,274,745 A | * | 6/1981 | Takahashi et al. ............. 356/427 |
| 4,303,342 A | * | 12/1981 | Takahashi ...................... 356/427 |
| 4,399,711 A | * | 8/1983 | Klein ........................... 73/864.16 |
| 4,402,612 A | * | 9/1983 | Alexander et al. ............. 356/427 |
| 4,443,699 A | * | 4/1984 | Keller ........................ 250/227.11 |
| 4,566,337 A | * | 1/1986 | Smart ........................... 73/861.56 |
| 4,654,535 A | | 3/1987 | Wolske |
| 4,727,247 A | * | 2/1988 | Johnston .................... 250/361 R |
| 4,733,095 A | * | 3/1988 | Kurahashi et al. ............. 250/577 |
| 4,870,292 A | | 9/1989 | Alpert |
| 4,880,971 A | | 11/1989 | Danisch |
| 4,902,137 A | * | 2/1990 | Krieg et al. .................... 356/427 |
| 4,956,560 A | * | 9/1990 | Smith et al. .................... 250/577 |
| 4,989,452 A | | 2/1991 | Toon et al. |

(Continued)

FOREIGN PATENT DOCUMENTS

EP    1151795    7/2001

(Continued)

OTHER PUBLICATIONS

Title: Design and operation of a fiber optic sensor for liquid level detection Author: Golnabi Source: Optics and Lasers in Engineering, vol. 41, Issue 5, May 2004, pp. 801.

*Primary Examiner* — John Lee
(74) *Attorney, Agent, or Firm* — David L. Nocilly; Bond Schoeneck & King

(57) ABSTRACT

A system and method for identifying the levels of one or more liquids in a vessel using an optical imager and one or more appropriately positioned light sources and an optical imager for capturing digital images of the illuminated vessel. A laser line generator is positioned oppositely from the imager and oriented to project a laser line through the vessel so that it may be imaged by the imager. A second light source, such as an LED, may be positioned above or below the vessel and oriented to project light downwardly or upwardly through the vessel and its contents. Captured images of the vessel are then processed by a programmable device, such as a microcontroller, to determine the levels of materials in the vessel based on the optical characteristics revealed in the captured image.

10 Claims, 5 Drawing Sheets

U.S. PATENT DOCUMENTS

| | | | |
|---|---|---|---|
| 4,994,682 A | 2/1991 | Woodside | |
| 5,072,616 A | 12/1991 | Sherrick | |
| 5,073,720 A | 12/1991 | Brown | |
| 5,369,713 A | 11/1994 | Schwartz et al. | |
| 5,463,228 A * | 10/1995 | Krause | 250/577 |
| 5,536,935 A * | 7/1996 | Klotzsch et al. | 250/223 B |
| 5,565,977 A * | 10/1996 | Rosinko | 356/39 |
| 5,648,844 A | 7/1997 | Clark | |
| 5,747,824 A * | 5/1998 | Jung et al. | 250/577 |
| 5,785,100 A | 7/1998 | Showalter et al. | |
| 6,252,980 B1 | 6/2001 | Schwartz et al. | |
| 6,448,574 B1 * | 9/2002 | Chow | 250/577 |
| 6,628,395 B2 * | 9/2003 | Liu et al. | 356/436 |
| 6,782,122 B1 | 8/2004 | Kline et al. | |
| 6,925,871 B2 * | 8/2005 | Frank | 73/293 |
| 6,993,176 B2 | 1/2006 | Yamagishi et al. | |
| 7,049,622 B1 * | 5/2006 | Weiss | 250/577 |
| 7,057,718 B2 * | 6/2006 | Kwirandt | 356/239.5 |
| 7,161,165 B2 | 1/2007 | Wirthlin | |
| 7,499,581 B2 * | 3/2009 | Tribble et al. | 382/141 |
| 7,710,567 B1 * | 5/2010 | Mentzer et al. | 356/436 |
| 7,786,457 B2 * | 8/2010 | Gao | 250/577 |
| 2003/0052288 A1 | 3/2003 | Calhoun | |
| 2006/0151727 A1 * | 7/2006 | Kamiya et al. | 250/577 |
| 2006/0178578 A1 * | 8/2006 | Tribble et al. | 600/432 |
| 2008/0066542 A1 * | 3/2008 | Gao | 73/290 R |
| 2008/0169044 A1 * | 7/2008 | Osborne et al. | 141/1 |
| 2009/0067669 A1 | 3/2009 | Kojima | |
| 2009/0154764 A1 | 6/2009 | Khan et al. | |
| 2010/0097465 A1 * | 4/2010 | Osborne et al. | 348/143 |
| 2010/0302540 A1 * | 12/2010 | Piana | 356/337 |
| 2011/0056290 A1 * | 3/2011 | Bryant et al. | 73/293 |

FOREIGN PATENT DOCUMENTS

| | | |
|---|---|---|
| FR | 1422356 | 12/1965 |
| FR | 2662248 | 11/1991 |
| JP | 60086439 | 5/1985 |
| JP | 63154917 | 6/1988 |
| JP | 2003307448 | 10/2003 |
| JP | 2006010453 | 1/2006 |
| JP | 2006029853 | 2/2006 |

* cited by examiner

SYSTEM AND METHOD FOR DETECTION OF LIQUID LEVEL IN A VESSEL

BACKGROUND OF THE INVENTION

1. Field of the Invention

The present invention relates to machine vision systems and, more specifically, to a system and method for automatically identifying the level of liquids in a vessel.

2. Description of the Related Art

Machine vision plays an important role in automated and robotic systems, such as assembly line manufacturing, quality control inspection, and sample processing. Conventional systems are generally comprised of an optical imager, such as a charged coupled device (CCD) or similar device using digital imaging technology, which is positioned to capture images of objects that pass in front of the imager. In low-light or enclosed applications, machine vision systems may include an illumination source, such as a bank of light emitting diodes (LEDs), positioned proximately to the imager. The images are subsequently processed to decode information contained in the resulting two-dimensional image, such as 1D linear codes, 2D stacked/matrix codes, OCR fonts, and postal codes. The image captured by the machine vision system may also be subjected to more advanced processing, such as shape recognition or detection algorithms, that provide information about the object of interest in the image.

In robotic sample handling systems, such as blood analyzers and the like, samples are moved to and from diagnostic modules for automatic testing and retesting using a loading rack that holds a plurality of carriers, such as test tubes filled with samples. The samples are generally contained within vessels, such as test tubes, that are accessed by the handling system for testing procedures. For example, a pipette may be lowered into a test tube and used to withdraw a predetermined amount of fluid from the test tube for further processing. In order to perform a proper withdrawal, the robotic handling system must be able to determine the appropriate distance into the vessel into which the pipette must be inserted in order to position the tip of the needle in the appropriate portion of the sample. For example, a test tube containing a blood sample that has been treated and centrifuged may contain multiple, individual layers of liquids that result from the separation of the blood and treatment materials. The proper location of the pipette may therefore require determining the location of the various layers so that the pipette may be inserted the appropriate distance into the vessel so that material from any of the layers may be withdrawn for further processing.

Current methods for determining liquid levels are relatively ineffective and do not provide accurate information. For example, capacitive approaches cannot determine the type of cap placed on the vessel, do not provide any information about sample quality, and will not work if the vessel contains a layer of foam. In addition, capacitive approaches have low reliability with respect to the detection of the location of the level. Ultrasonic approaches are also unable to detect the type of cap, will not work if there is a cap or if there are multiple layer levels, do not provide any information about sample quality, will not work with foam, and are only moderately effective. Finally, pressure based systems are also unable to determine the type of cap, will not work if a cap is present, cannot detect multiple layers, cannot provide any information about sample quality, will not work if foam is present, and are only moderately accurate. All of these approaches also require contact with the vessel or very close proximity to the vessel for operation.

BRIEF SUMMARY OF THE INVENTION

The present invention provides a system and method for identifying the levels of one or more liquids in a vessel using one ore more appropriately positioned light sources and an optical imager for capturing digital images of the illuminated vessel. For example, a line generator may be positioned on one side of the vessel and oriented to project a line of light that intersects each layer of liquid in the vessel. An optical imager is positioned on the opposing side of the vessel from the laser line generator and oriented to capture an image of the vessel along with whatever portions of the laser line are visible through the vessel. A second light source, such as an LED, may be positioned above or below the vessel and oriented to project light downwardly or upwardly, respectively, through the vessel and its contents. Captured images of the vessel are then processed by a programmable device, such as a microcontroller, to determine the levels of materials in the vessel based on the optical characteristics revealed in the captured image.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
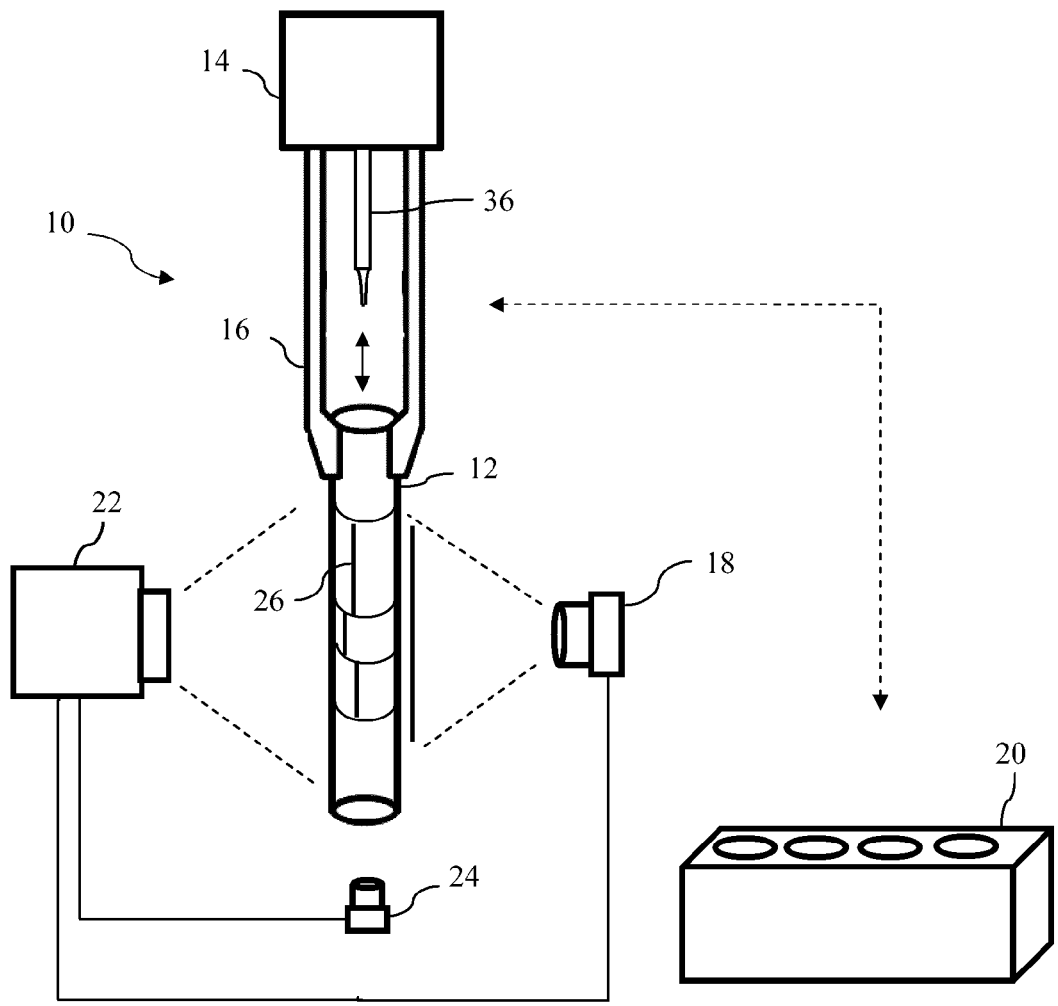
FIG. 1 is a schematic a robotic handling system including a system for detecting liquid level according to the present invention.

Referring now to the drawings, wherein like reference numerals refer to like parts throughout, there is seen in FIG. 1 a machine vision system 10 for determining the level of liquids in a vessel, such as a test tube 12, in connection with a robotic handling system 14 or the like. In general, robotic handling systems are motorized systems having an arm 16 for moving and/or transferring patient sample test tubes 12 between designated locations, such as from a rack 20 to another location or back to rack 20. Patient sample tubes can comprise any variety of test tube or comparable vessel and frequently contain one or more different body fluids, such as blood, urine, etc., treatment and processing fluids, that separate into multiple layers.

As further seen in FIG. 1, system 10 includes a line generator 18, such as a laser line generator, positioned oppositely from an optical imager 22 and oriented to project its line of light toward imager 22. When the spot from a laser is scanned along the long axis of tube 12 at the correct angle of incidence, as it impinges on the interface between two layers, a significant portion of the light will be reflected perpendicularly to the surface of the liquid and exits the top and bottom of the test tube.

Figure 2:
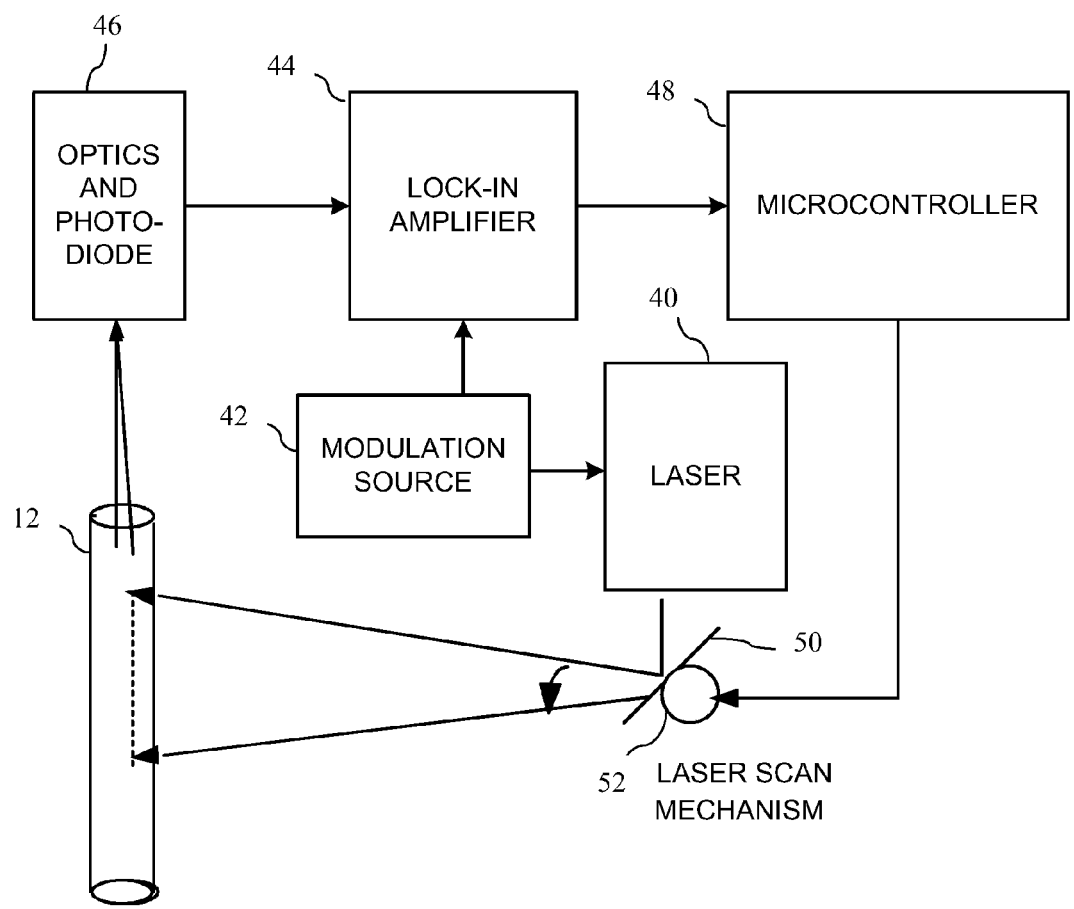
FIG. 2 is a schematic of a laser line system according to the present invention.

When one or more labels are present, the amount of light coupled into tube 12 is significantly reduced and is difficult for a vision-based system to detect and measure the light exiting tube 12. For this reason, a non-imaging photodiode-based optical system as seen in FIG. 2 may be employed as an alternative embodiment to that seen in FIG. 1. In this system, line generator 18, shown as a laser 40, scans at the appropriate angle along the long axis of tube 12. To eliminate the effects of ambient light sources, a simple synchronous modulation-detection system may be implemented. Line generator 18 may be modulated at some frequency by a modulation source 42 and a lock-in amplifier circuit 44 will detect only light generated by laser 40. The light detected by the optics and photodiode 46 will be digitized for analysis by a microcontroller 48. The scan angle of the laser may be controlled via a mirror 50 controlled via a stepper motor 52 or similar technique. Microcontroller 48 may communicate the results to imager 22 or a host device.

As seen in FIG. 1, a light source 24, such as an LED may also be positioned above or below the field of view of imager 22 and oriented to project light downwardly or upwardly, respectively, into the field of view. FIG. 1 is shown with light source 24 positioned below, and imager 22, laser line generator 28, and LED positioned laterally from rack 20, such that arm 16 may extract test tube 12 from rack 20 and move tube 20 into a position where line generator 18 will project a line onto tube 12 and LED 24 will illuminate tube 12 from below. The laser line projected by laser line generator 18 should pass through test tube 12 and be visible on the opposing side of test tube 12. Differences in the refractive indices of the fluid in test tube 12 will cause the projected laser line to bend different amount, thereby producing a projected line 26 comprising series of broken lines that reveal the level of each liquid inside test tube 12.

Imager 22 is preferably positioned oppositely from laser line generator 28, but can be positioned in any location that allows imager 22 to capture an image of the projected laser line 26. It should be recognized by those of skill in the art that the particular location of imager 22, laser line generator 18 and LED 24 may vary relative to rack 20, and each other, depending on the particular structure of the handling system, provided that the alignment of imager 22, laser line generator 18 and LED 24 with respect to each other allows imager 22 to capture images of test tube 12 that include the projected line 26 of the laser line after it passes through tube 12.

Figure 3:
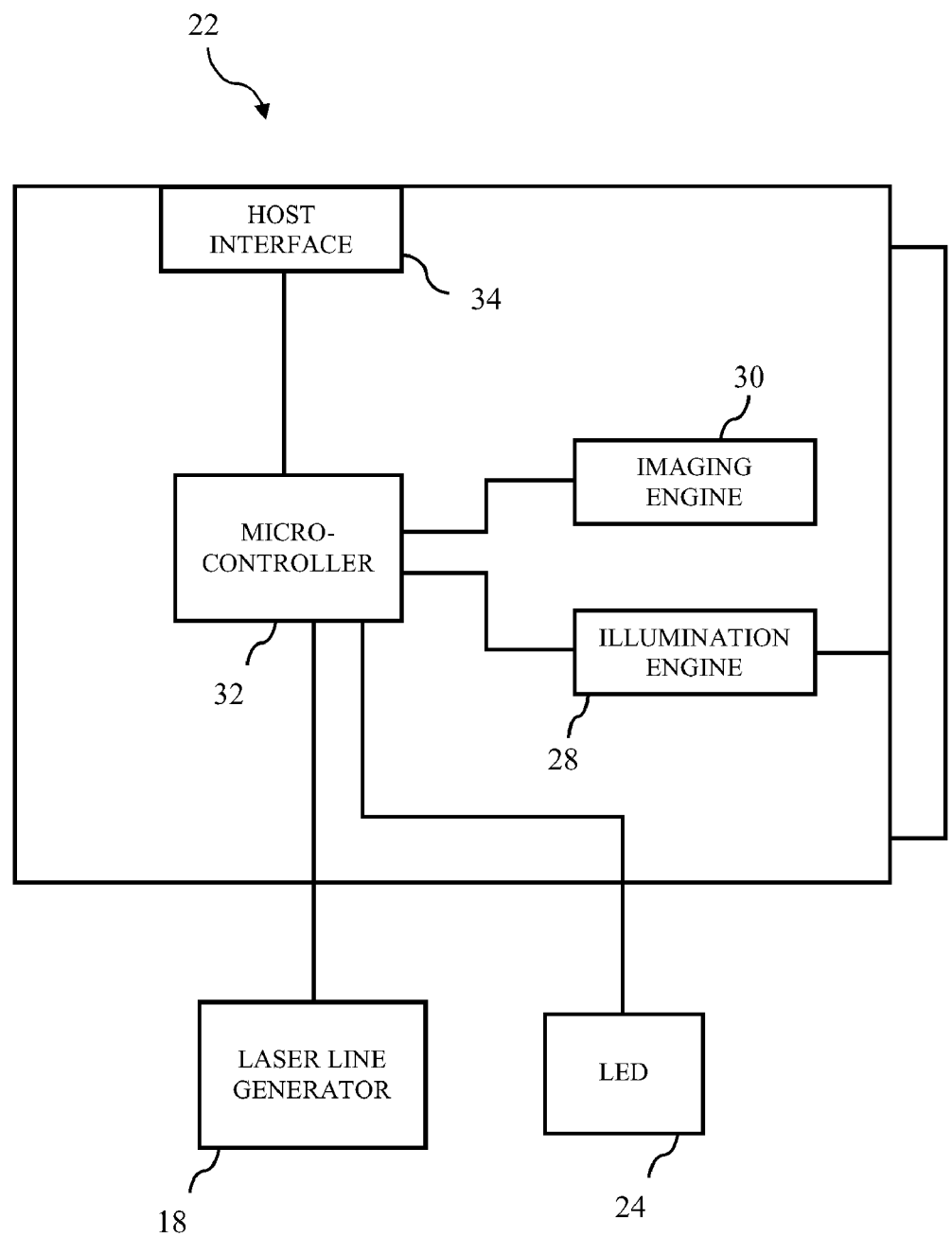
FIG. 3 is a schematic of an optical imager for a system for detecting liquid level according to the present invention.

Referring to FIG. 3, imager 22 may comprise any various off-the-shelf optical imagers. For example, Honeywell Scanning and Mobility of Skaneateles Falls, N.Y. sells 5080 and 5180 series imagers that are capable of scanning and decoding most standard barcodes including linear, stacked linear, matrix, OCR, and postal codes. Other optical imaging platforms may include the EA15 and XA21 imagers available from Intermec Technologies Corporation of Everett, Wash., or any custom imaging package sold commercially for incorporation into machine vision or optical imaging systems. Preferably, imager 22 comprises an associated illumination engine 28 for managing any onboard illumination sources, an imaging engine 30 (and accompanying digital camera engine and optics), and a digital signal processing processor 32, such as a 96 MHz MXL fixed-point processor.

In a preferred embodiment of the present invention, laser line generator 18 and upwardly projecting LED 24 are also interconnected to imager 22 so that imager 22 can control the timing and duration of laser line generation and test tube illumination. Alternatively, laser line generator 18 and LED 24 may be powered and controlled by another device. Imager 22 further includes a host interface 34 for communicating with a host device, such as the robotic handling system. Interface 34 may also comprise a conventional RS232 transceiver and associated 12 pin RJ style jack or other conventional buses, such as USB, IEEE 1394, I2C, SPI, or PCMCIA, or other connector styles, such as an FFC style. Imager 22 is preferably connected to a host system through either RS232 serial port or TCP/IP protocol and configured as a slave device to accept control and configuration commands from and returning the information to the host system.

Microcontroller 32 is preferably programmed to process captured images locally, thereby avoiding the need to transmit captured images to a host and improving the speed and efficiency of system 10. Preferably, microcontroller is programmed to interpret captured images of tube 12 to determine the location of the levels of any liquids contained in tube 12. The level information may then be transmitted to a host, such as robotic handler 14, so that handler 14 can more accurately position a pipette 36 the proper distance into tube 12 for extraction of any of the various liquids contained in tube 12 with withdrawing any liquid from adjoining levels.

More specifically, microcontroller 32 may be programmed to interpret images captured by imager 22 to determine the level of each liquid inside test tube 12. In addition, microcontroller 32 may be programmed to further determine whether test tube 12 has a cap positioned thereon and, if so, determine what type of cap. Microcontroller 32 may further be programmed to provide information about the quality of the sample and its color indices, or to decode any information placed onto test tube 12, such as a barcode.

Figure 4:
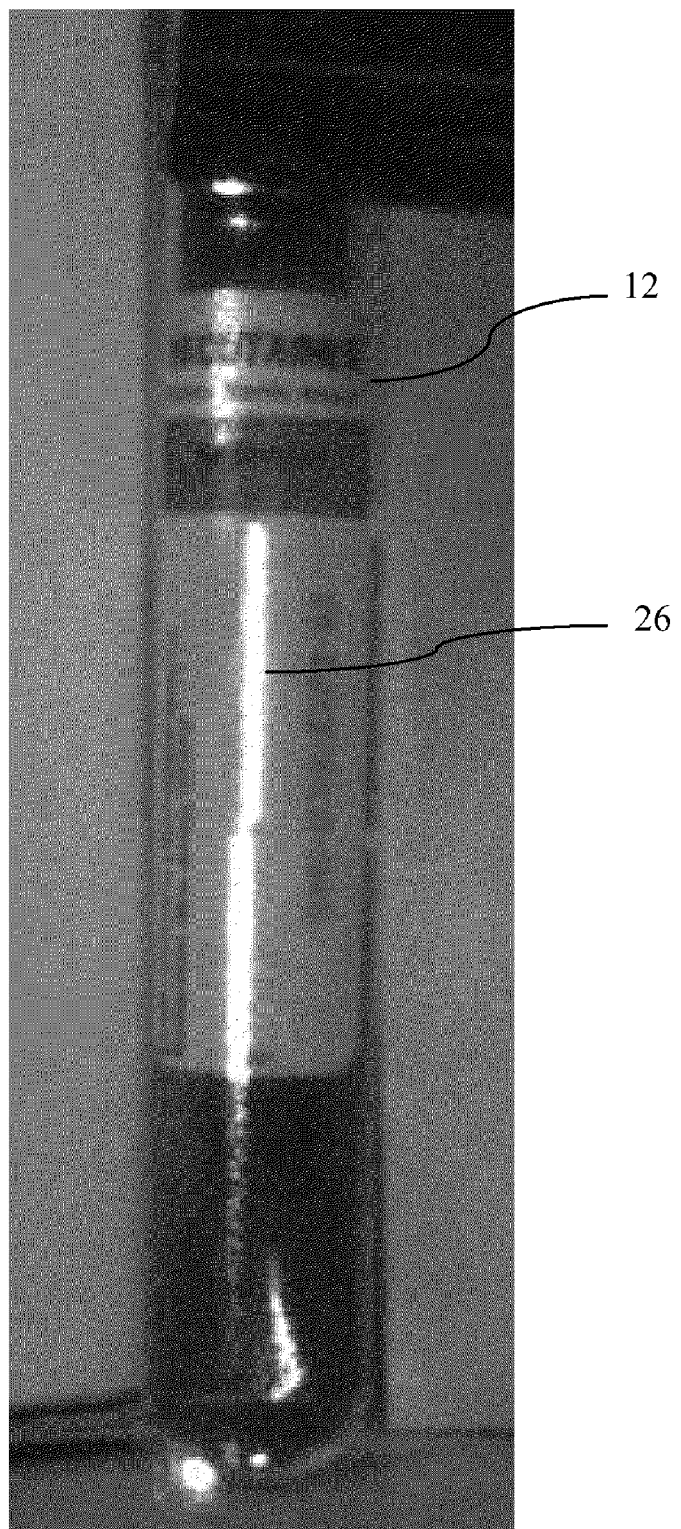
FIG. 4 is a sample image captured by a system for detecting liquid level according to the present invention.

With respect to liquid level detection, the present invention employs a line of light or laser line that exploits the differences in the indices refraction between the layers of liquids and liquid and art contained in the tube singularly or in combination with a strong upward or, optionally, downward directed LED or laser spot illumination that highlights the circumference at the top liquid/air interface or at subsequent liquid/liquid interfaces. As seen in FIG. 4, the projected line 26 is visible in an optical image captured by an imager 22, even when a label is present on tube 12. Preferably, both the refracted laser line pattern and the highlighted air/liquid or liquid/liquid interfaces are imaged by imager 22, either simultaneously or in series. The captured images are analyzed to determine the location of the resulting end points of the projected line 26, which serve an indicator of the liquid/air or liquid/liquid interfaces within the tube. This data is further analyzed to determine the location of the end points of the projected line 26 relative to the bottom of tube 12 to determine the fill levels and may be further analyzed to determine the volumes given that the tube diameter is known and that the tube wall thickness can been factored into the volume calculation. These results may then be used to verify the previously determined data and to provide correction factors if required.

Figure 5:
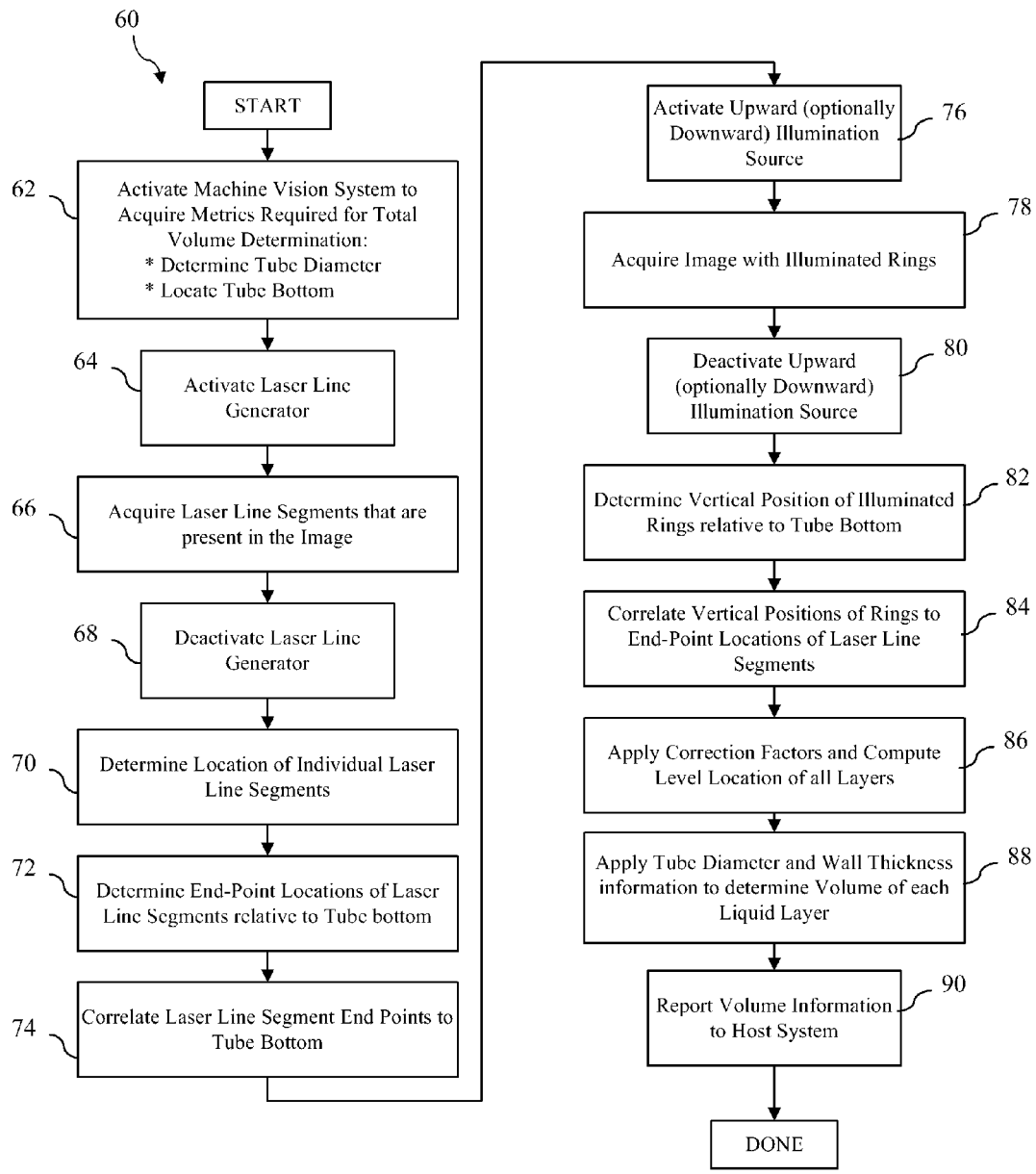
FIG. 5 is a flowchart of a method for determining the levels of liquids in a vessel using images according to the present invention.

Referring to FIG. 5, a detailed process 60 may be used to acquire necessary information from tube 12. First, system is activated 62 to acquire the appropriate metrics, namely, the tube diameter and location of tube bottom. Next, the laser line generator 64 is activated and the laser line segments in the image are acquired 66. The laser line generator may then be deactivated 68. The location of the individual laser line segments are then determined 70, and the end-point locations of the laser line segments are determined 72 relative to the tube bottom. The laser line segment end points are then correlated to the tube bottom 74, and the second illumination source is activated 76. One or more images are then acquired 78 which show the illuminated rings of each liquid level, and the secondary illumination source is deactivated 80. The vertical positions of the rings are then determined 82 relative to the tube bottom. Next, the vertical positions of the rings are correlated 84 to the end-point locations of the laser line segments. The level location of all layers may then be computed 86 after applying correlation factors to account for recurring differences between the line segment location data and the ring location data. The volume of each liquid layer may then be determined 88 by using the tube diameter, wall thickness, and liquid layer level information. The final volume information is then reported to the host system 90.

With respect to test tube and test tube cap identification, application Ser. No. 12/145,619, hereby incorporated by reference in its entirety, details a system and method for determining the presence of a cap on a test tube as well as the type of test tube and cap, using images captured by an optical imager such as imager 22.

With respect to barcode decoding, conventional imager that may serve as all or part of imager 22 discussed above may be equipped with algorithms for decoding all the symbologies shown in Table 1 below.

TABLE 1

| Codabar | EAN/JAN-13 | PDF417 |
|---------|------------|--------|
| Code 39 | EAN/JAN-8 | Micro PDF417 |
| I 2 of 5 | RSS-14 | DataMatrix |
| Code 93 | RSS-Limited | MaxiCode |
| Code 128 | RSS-Expanded | Aztec Code |
| UPC-A | PosiCode | |
| UPC-E0 | Code 49 | |

Barcode symbologies and their decoding algorithms follow the international barcode standards and those of skill in the art will instantly appreciate how to accomplish this functionality through the use of off-the-shelf imagers or decoding packages.

Imager 22 may be programmed to capture a series of images of test tube 22 that are stitched together to form a panoramic image of test tube 22. Image stitching involves combining multiple photographic images with overlapping fields of view to produce a segmented panorama or high-resolution image. Those of skill in the art will recognize that a panoramic image may be processed according to the present invention to determine the levels of liquids in test tube 12 rather than using a single captured image.

Most approaches to image stitching require nearly exact overlaps between images and identical exposures to produce seamless results. This process is also known as mosaicing. The stitching process involves three stages: image calibration, image registration, and image blending. Image calibration consists of processing to improve image quality and ease of stitching, such as perspective correction, vignetting correction, and chromatic aberration correction. Image registration involves analysis for translation, rotation, and focal length. Alternatively, direct or feature-based image alignment methods may be used. Direct alignment methods search for image orientations that minimize the sum of absolute differences between overlapping pixels. Feature-based methods determine proper image orientations by identifying features that appear in multiple images and overlapping them. Finally, image blending involves combining of the images and may further entail color correction to match the adjoining areas of the component images for color, contrast, and brightness to avoid visibility of the seams, dynamic range extension, and motion compensation, such as deghosting and deblurring, to compensate for moving objects.

Generally, image stitching is a very computation-intensive process, and usually not suitable to be performed on-line on imagers 22 which are often limited by both speed and memory. However, by shifting some of the computation to off-line calibration, operational image stitching computations can be greatly improved. Off-line calibration is grounded in the fact that imager 22 is fixed mounted, so the relative position between the placement of tubes 12 and imager 22 is fixed. Thus, the perspective transformation from the imager of tube 12 to imager 2 is almost fixed. Because the sample tube is held still upright by robotic handler 14, which must be able to rotate tube 12 and conventional robotic systems can in fact do so, the geometrical perspective shift parameters from one image to the next will be limited to the horizontal direction. The variation for the other geometrical parameters, such as vertical direction translation shift, scale, and rotation shift are small or negligible, thereby greatly simplifying the image registration process by limiting the search space. If tube rotation speeds are kept constant by robotic handler 14, the time difference between subsequent image captures should be relatively constant. The optimal adjustment between imager capture speed and image rotation speed can provide a nearly exact overlap between the consecutive tube images and the shift parameters should be nearly identical during the stitching process. In system 10, imager 14 may also be configured to use identical exposures when capturing images to produce more seamless results. Finally, as the stitched images are used mainly for barcode decoding and liquid level detection, not for viewing, a small boundary effect may be tolerated. Therefore, stitching can be further simplified, such as by avoiding the blending, color correction, chromatic correction required for images that are to be viewed visually. Based on these characteristics of system 10, most of the image stitching computations, i.e., the initial estimation of image stitching geometry shift parameters, may be transferred to off-line processing and be pre-computed by host 16.

Following is an example stitching process, although those of ordinary skill in the art will recognize that other methods may be used. Let $x'=[x',y',1]$ and $x=[x,y,1]$ denote the corresponding position between the current image and previous image. The most general planar 2D transform is the eight-parameter perspective transform like $$x' = Hx = \begin{bmatrix} h_{00} & h_{01} & h_{02} \\ h_{10} & h_{11} & h_{12} \\ h_{20} & h_{21} & h_{22} \end{bmatrix} x \quad (1)$$

$$x' = \frac{h_{00}x + h_{01}y + h_{02}}{h_{20}x + h_{21}y + h_{22}}, \quad y' = \frac{h_{10}x + h_{11}y + h_{12}}{h_{20}x + h_{21}y + h_{22}}$$

The image registration is just seeking to estimate H using the corresponding matching image points from the consecutive two images. During off-line processing, it is possible to use a calibration image to get an estimated transform $\overline{H}$. The real transform should be $$x'=Hx=(\overline{H}+\Delta H)x=\overline{H}x+\Delta Hx \quad (2)$$

Reviewing the characteristics described above, $\Delta H$ should be very small. As noted above, a search for $\Delta H$ can be limited to the horizontal direction, i.e., $\Delta h_{02}$ within a lot of pixels. The off-line estimation of the transform matrix $\overline{H}$ is estimated from PC and saved in the camera non-volatile memory. Another important factor is that with the default $\overline{H}$ is a necessity for some two tubes images where there are not very strong salient local structure (such as corners, text, lines, etc) among the images and the stitching is error-prone or impossible, we can use default $\overline{H}$ to replace H directly in this case. Those of skill in the art will recognize that, during calibration, more than transformation matrix should be calculated and used later. For example, camera calibration (intrinsic parameters estimations) is well known, and it can be used to convert the world coordinates to the image coordinates. With the present invention, imager 22 is fixed and tube 12 should be held upright vertically. As a result, only the scalars converting the number of pixels to millimeters is needed and easy to do in the calibration process.

To further reduce the computation for stitching process, the requirement for tube stitching reconstruction fidelity may be changed from the preferred stitching process. As explained above, the tube rotation images are stitched mainly for the purpose of reading the barcode and measuring liquid level. As long as the barcode reading and liquid level detection are right, some distortion and boundary effects are tolerated. Thus, the estimation of the perspective transform (both off-line and on-line) may be limited to a few of the eight parameters. However, in some cases, the parameters search must be expanded to all of the coefficients in order to read 2-D barcodes where the dimensions of the 2-D barcodes are larger than the overlap dimension between each tube rotation sub-image, or where other important information, such as handwriting on the tube label, must be recorded.

What is claimed is:

1. An apparatus for determining the level of one or more liquids in a test tube containing at least one liquid, comprising:
    a line generator positioned to project a line of light through said test tube;
    a light source positioned below said test tube and oriented to project light through the bottom of said test tube such that at least one layer of said at least one liquid is illuminated;
    an optical imager aligned to capture at least one image of the line when projected through said test tube and of the illuminated layer; and
    a microcontroller associated with said imager that is programmed to determine the level of at least one liquid in said test tube based on said captured image of said laser line projected into said vessel and said illuminated layer.

2. The apparatus of claim 1, further comprising a host interface interconnecting said imager and a remote host and wherein said microcontroller is programmed to export the level of said at least one liquid in said vessel to said host through said host interface.

3. The apparatus of claim 2, wherein said host comprises a robotic handling system including a robotic arm and robotic pipette.

4. The apparatus of claim 3, wherein said robotic handling system is programmed to insert said into said vessel to reach said at least one liquid based upon the exported level of said at least one liquid.

5. The apparatus of claim 1, wherein said at least one image comprising a series of images stitched together to form a panoramic image of said vessel.

6. A method of determining the level of at least one liquid in a test tube, comprising the steps of:
    projecting a line of light into said test tube;
    projecting light upwardly into the bottom of said test tube to illuminate at least one liquid layer in said test tube;
    capturing an image of said projected line after it passed through said test tube and of said said illuminated liquid layer;
    interpreting said captured image to detect one or more locations where said projected line is altered by any contents in the test tube; and
    identifying the position of said at least one liquid in said vessel based on the location of any alterations of said projected line.

7. The method of claim 6, further comprising the step of determining the volume of said at least one liquid based on the level of said at least one liquid, the location of the bottom of said vessel, and the cross-sectional area of said test tube.

8. The method of claim 7, further comprising the step of transmitting said volume to a host device.

9. The method of claim 8, wherein said host device is a robotic handling system.

10. The method of claim 6, wherein the step of capturing an image of said projected line after it passed through said test tube comprises capturing a series of image of said test tube and stitching said images together to form a single panoramic image.

* * * * *